(12) United States Patent
Murase et al.

(10) Patent No.: US 10,424,791 B2
(45) Date of Patent: Sep. 24, 2019

(54) PROCESS FOR MANUFACTURING ELECTRODE FOR SECONDARY BATTERY

(71) Applicants: KABUSHIKI KAISHA TOYOTA JIDOSHOKKI, Kariya-shi, Aichi (JP); ARAKAWA CHEMICAL INDUSTRIES, LTD., Osaka (JP)

(72) Inventors: Hitotoshi Murase, Kariya (JP); Toshio Otagiri, Kariya (JP); Kyoichi Kinoshita, Kariya (JP); Katsufumi Tanaka, Kariya (JP); Manabu Miyoshi, Kariya (JP)

(73) Assignee: Arakawa Chemical Industries, Ltd, Osaka (JP)

(*) Notice: Subject to any disclaimer, the term of this patent is extended or adjusted under 35 U.S.C. 154(b) by 0 days.

(21) Appl. No.: 14/987,859

(22) Filed: Jan. 5, 2016

(65) Prior Publication Data

US 2017/0194646 A1 Jul. 6, 2017
US 2019/0245208 A9 Aug. 8, 2019

Related U.S. Application Data

(62) Division of application No. 12/672,887, filed as application No. PCT/JP2008/062713 on Jul. 14, 2006, now abandoned.

(30) Foreign Application Priority Data

Aug. 10, 2007 (JP) ................................ 2007-210228

(51) Int. Cl.
*H01M 4/04* (2006.01)
*H01M 4/62* (2006.01)
(Continued)

(52) U.S. Cl.
CPC ......... *H01M 4/622* (2013.01); *H01M 4/0404* (2013.01); *H01M 4/1395* (2013.01);
(Continued)

(58) Field of Classification Search
USPC ........................................................... 427/115
See application file for complete search history.

(56) References Cited

U.S. PATENT DOCUMENTS

2003/0040578 A1 2/2003 Sugo et al.
2003/0104131 A1* 6/2003 Konno ................ C04B 35/5603
427/376.2

(Continued)

FOREIGN PATENT DOCUMENTS

EP 0 652 602 A2 5/1995
EP 1 246 280 A2 10/2002
(Continued)

OTHER PUBLICATIONS

International Search Report dated Aug. 19, 2008, for international application No. PCT/JP2008/062713.
(Continued)

*Primary Examiner* — Brian K Talbot

(57) ABSTRACT

It is an assignment to be solved to provide an electrode for secondary battery, electrode in which the active material is suppressed from coming off or falling down from the electricity collector, and that has excellent cyclic performance.
It is characterized in that, in an electrode for secondary battery, the electrode being manufactured via an application step of applying a binder resin and an active material onto a surface of electricity collector, said hinder resin is an alkoxysilyl group-containing resin that has a structure being specified by formula (I):
(Continued)

[Chemical Formula 1]

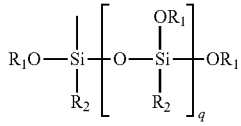

(I)

wherein "$R_1$" is an alkyl group whose number of carbon atoms is from 1 to 8;

"$R_2$" is an alkyl group or alkoxyl group whose number of carbon atoms is from 1 to 8; and "q" is an integer of from 1 to 100.

3 Claims, 3 Drawing Sheets

(51) Int. Cl.
*H01M 10/0525* (2010.01)
*H01M 4/38* (2006.01)
*H01M 4/1395* (2010.01)
*H01M 4/02* (2006.01)

(52) U.S. Cl.
CPC ....... *H01M 4/386* (2013.01); *H01M 10/0525* (2013.01); *H01M 2004/027* (2013.01)

(56) References Cited

U.S. PATENT DOCUMENTS

| | | | |
|---|---|---|---|
| 2004/0058240 A1 | 3/2004 | Christensen | |
| 2005/0191550 A1 | 9/2005 | Satoh et al. | |
| 2005/0214644 A1* | 9/2005 | Aramata | H01B 1/122 |
| | | | 429/218.1 |
| 2006/0099506 A1* | 5/2006 | Krause | C08G 73/106 |
| | | | 429/217 |
| 2011/0031935 A1* | 2/2011 | Miyoshi | H01M 4/134 |
| | | | 320/148 |
| 2011/0244326 A1* | 10/2011 | Murase | H01M 4/0404 |
| | | | 429/217 |

FOREIGN PATENT DOCUMENTS

| | | | |
|---|---|---|---|
| EP | 2178140 | * | 4/2010 |
| EP | 2267824 | * | 12/2010 |
| JP | 11-130539 A | | 5/1999 |
| JP | 2000-223112 A | | 8/2000 |
| JP | 2000-223126 A | | 8/2000 |
| JP | 2001-068115 A | | 3/2001 |
| JP | 2002-289196 A | | 10/2002 |
| JP | 2003-171180 A | | 6/2003 |
| JP | 2004-221014 A | | 8/2004 |
| JP | 2005-310759 A | | 11/2005 |
| JP | 2006-059558 A | | 3/2006 |
| JP | 2006-339092 A | | 12/2006 |
| JP | 2009043678 | * | 2/2009 |
| JP | 2009259694 | * | 11/2009 |
| JP | 51029007 | * | 1/2013 |
| JP | 5136180 | * | 2/2013 |
| KR | 2005-0057430 A | | 6/2005 |
| WO | WO 2009/022513 | * | 2/2009 |
| WO | WO 2009/128319 | * | 10/2009 |

OTHER PUBLICATIONS

Notification of Reasons for Refusal for the Corresponding Japanese Patent Application No. 2007-210228 (dated Jun. 5, 2012),along with English translation.

Second Office Action From Counterpart Korean Application 2010-7002287 dated Sep. 26, 2012 (with English Translation).

Partial European Search Report for EP Application No. EP 08 79 1138.

Rossi, Nicholas A. A.; Zhang, Zhengcheng; Wang, Qingzheng; Amine, Khalil; West, Robert, Oligo (ethylene oxide)—functionalized siloxanes: decreasing viscosity and increasing conductivity, 2005, American Chemical Society, Division of Polymer Chemistry, 46(1), 723-724.

\* cited by examiner

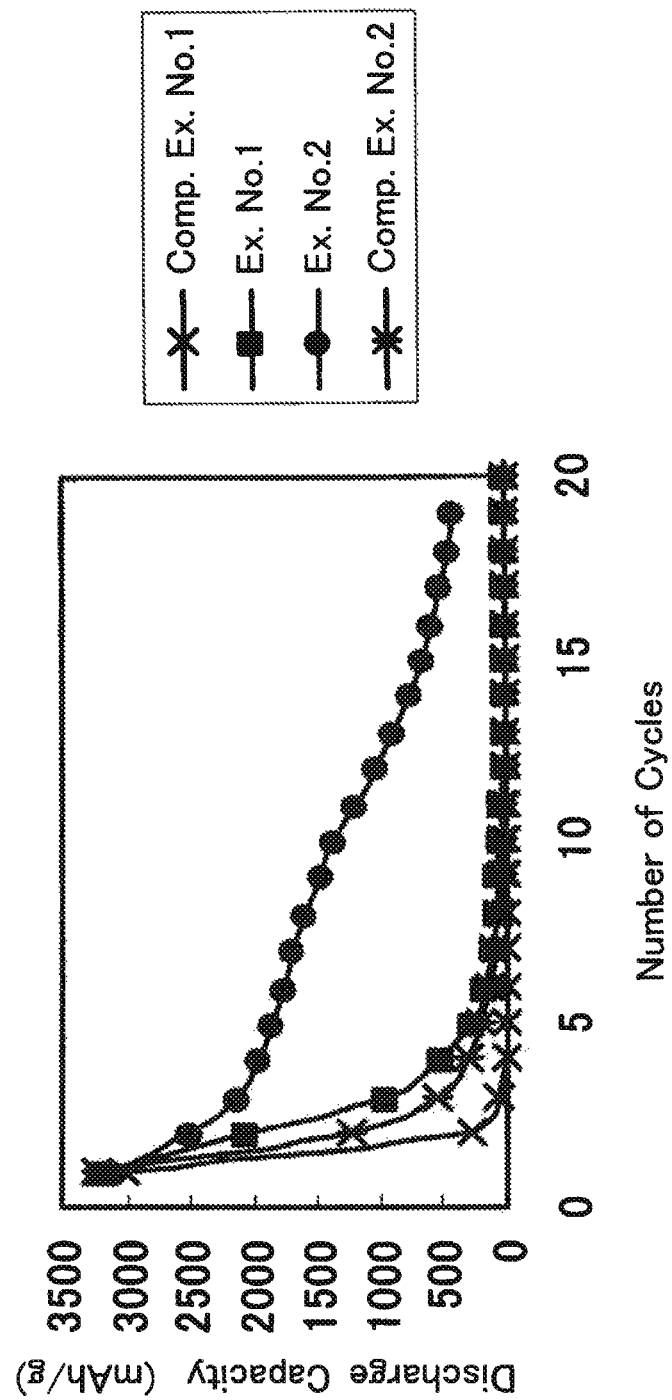

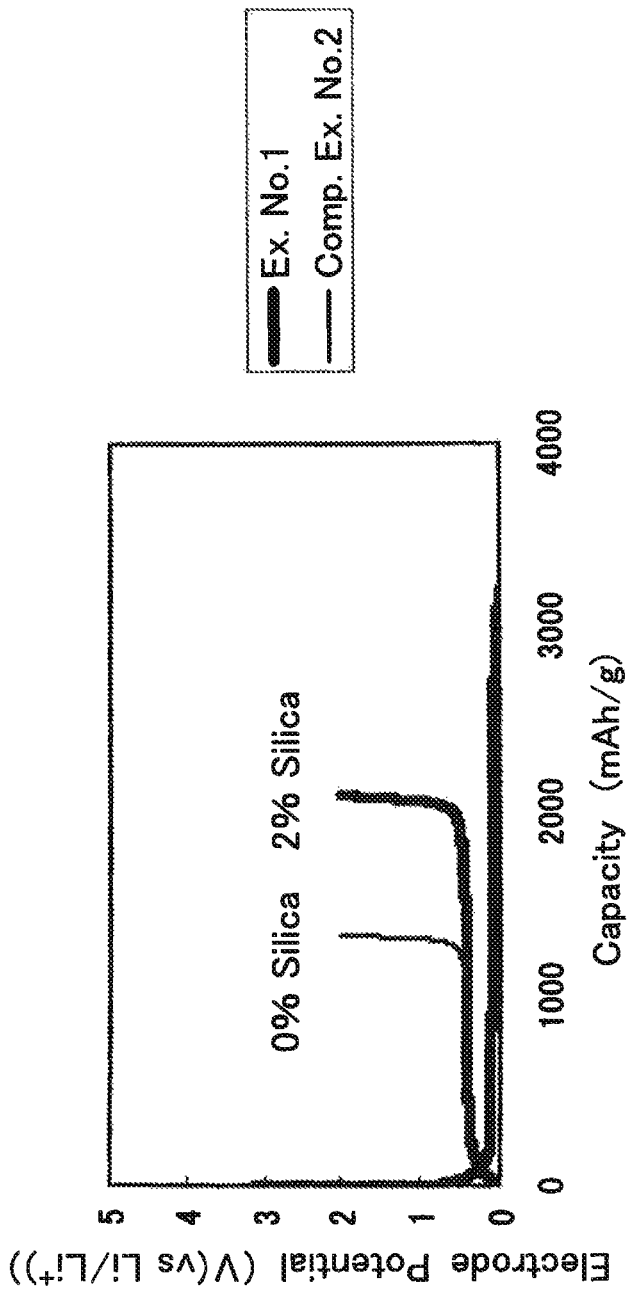

PROCESS FOR MANUFACTURING ELECTRODE FOR SECONDARY BATTERY

This is a divisional of co-pending application Ser. No. 12/672,887, filed Feb. 9, 2010.

TECHNICAL FIELD

The present invention is one which relates to an electrode for secondary battery, and to a manufacturing process for the same.

BACKGROUND ART

Since downsizing and weight saving of electronic devices have been advancing, secondary batteries whose energy density is high have been desired for their power source. A secondary battery is one that takes out chemical energy, which the positive-electrode active material and negative-electrode material possess, as electric energy by means of chemical reaction through electrolyte. In such secondary batteries, lithium-ion secondary batteries are secondary batteries, which possess a higher energy density, among those that have been put in practical use. Even among those, the spreading of organic-electrolyte-system lithium-ion secondary batteries (hereinafter being recited simply as "lithium-ion secondary batteries") has been progressing.

For lithium-ion secondary battery, lithium-containing metallic composite oxides, such as lithium-cobalt composite oxides, have been used mainly as an active material for the positive electrode; and carbonaceous materials, which have a multi-layered structure that enables the insertion of lithium ions between the layers (i.e., the formation of lithium intercalation complex) and the discharge of lithium ions out from between the layers, have been used mainly as an active material for the negative electrode. The positive-electrode and negative-electrode polar plates are made in the following manner: these active materials, and a binder resin are dispersed in a solvent to make a slurry, respectively; then the resulting slurries are applied onto opposite faces of a metallic foil, namely, an electricity collector, respectively; and then the solvent is dry removed to form mixture-agent layers; and thereafter the resulting mixture-agent layers and electricity collector are compression molded with a roller pressing machine.

In the other secondary batteries as well, although the types of respective active materials, electricity collectors, and the like, differ, such secondary batteries have been available as those in which the active materials are bound or immobilized to the electricity collector by means of a binder resin similarly.

As for the binder resin on this occasion, polyvinylidene fluoride (hereinafter being abbreviated to as "PVdf") has been used often for both of the electrodes. Since this binder resin is a fluorinated resin, the adhesiveness to electricity collectors is poor, and accordingly it is probable that the falling down of active materials might occur.

Moreover, as the negative-electrode active material for lithium secondary battery, the development of next-generation negative-electrode active materials, which possess a charge/discharge capacity that exceeds the theoretical capacity of carbonaceous material, has been advanced recently. For example, materials that include a metal, such as Si or Sn, which is capable of alloying with lithium, are regarded prospective. In the case of using Si or Sn, and so forth, for an active material, it is difficult to maintain the bonded state to electricity collector satisfactorily even when the aforementioned fluorinated resin is used for the binder, because the volumetric change of the aforementioned active material that is accompanied by the occlusion/release of Li at the time of charging/discharging is great. These materials exhibit a large rate of volumetric change that is accompanied by the insertion and elimination of lithium; and accordingly they are associated with such a drawback that the cyclic degradation is great considerably, because they are expanded and contracted repeatedly so that their active-material particles have been pulverized finely or have come to be detached.

In Patent Literature No. 1, there is a recitation on a negative electrode for secondary battery that has excellent cyclic performance, and in which the battery reliability at high temperatures is improved by means of binding the following together with a binder, such as polyimide or polyamide-imide, which has been known as a heat-resistant polymer: an active material containing an element that is capable of alloying with lithium; a catalytic element for promoting the growth of carbon nano-fibers; and composite particles containing carbon nano-fibers that have been grown from the active material's surface.

Moreover, in Patent Literature No. 2, a binder resinous composition for battery is disclosed, binder resinous composition in which a block copolymer is used, block copolymer in which nonpolar molecular species that do not have any ring on the principal-chain framework, and polar molecular species that have a ring on the principal-chain framework are bonded to each other. In the examples, it indicates that the cyclic life of nonaqueous-electrolytic-solution secondary batteries, which were made by using the binder resinous composition that included the block copolymer, was improved.

Patent Literature No. 1: Japanese Unexamined Patent Publication (KOKAI) Gazette No. 2006-339,092; and Patent Literature No. 2: Japanese Unexamined Patent Publication (KOKAI) Gazette No. 2004-221,014.

DISCLOSURE OF THE INVENTION

Assignment to be Solved by the Invention

Although binder resins that bind active materials together as set forth in Patent Literature No. 1 and Patent Literature No. 2 have been investigated, a binder resin with furthermore improved performance has been sought in the process of investigating next-generation active materials.

The present invention is one which has been done in view of such circumstances, and it is an object to provide an electrode for secondary battery, electrode in which the active material is suppressed from coming off or falling down from the electricity collector, and which has excellent cyclic performance.

Means for Solving the Assignment

As a result of earnest studies being made by the present inventors, they found out that it is possible to provide an electrode for secondary battery, electrode in which the active material is suppressed from coming off or falling down from the electricity collector and which has good cyclic performance, by means of utilizing a specific resin that has not been utilized so far as a binder resin for secondary-battery electrode, that is, an alkoxysilyl group-containing resin that has a structure being specified by formula (I), as a binder resin for electrode.

Specifically, an electrode for secondary battery according to the present invention is characterized in that, in an electrode for secondary battery, the electrode being manufactured via an application step of applying a binder resin and an active material onto a surface of electricity collector, said binder resin is an alkoxysilyl group-containing resin that has a structure being specified by formula (I).

Chemical Formula 1):

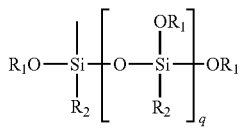

(I)

wherein "$R_1$" is an alkyl group whose number of carbon atoms is from 1 to 8;

"$R_2$" is an alkyl group or alkoxyl group whose number of carbon atoms is from 1 to 8; and "q" is an integer of from 1 to 100.

The alkoxysilyl group-containing resin that has a structure being specified by formula (I) is a hybrid composite of resin and silica. The thermal stability becomes higher than that of the resinous simple substance by means of turning into a hybrid composite of resin and silica.

Moreover, said alkoxysilyl group-containing resin has a structure that is specified by formula (I). The structure that is specified by formula (I) is a structure that is made of parts having undergone sol-gel reaction, and accordingly indicates that unreacted parts that undergo a sol-gel reaction remain. Consequently, the sol-gel reaction also occurs when the binder resin cures, and thereby not only the parts having undergone sol-gel reaction react with each other but also react with the resin's OH groups. Moreover, they are believed to react with the electricity collector's surface as well. Therefore, it is possible to retain the electricity collector and the active material firmly to each other.

As said alkoxysilyl group-containing resin, it is possible the following can be used: an alkoxy group-containing silane-modified bisphenol type-A epoxy resin, an alkoxy group-containing silane-modified novolac-type epoxy resin, an alkoxy group-containing silane-modified acrylic resin, an alkoxy group-containing silane-modified phenolic resin, an alkoxy group-containing silane-modified polyamic acid resin, an alkoxy group-containing silane-modified soluble polyimide resin, an alkoxy group-containing silane-modified polyurethane resin, or an alkoxy group-containing silane-modified polyamide-imide resin.

In particular, it is more preferable that said alkoxysilyl group-containing resin can be adapted into an alkoxy group-containing silane-modified polyamic acid resin or an alkoxy group-containing silane-modified polyamide-imide resin. Since the aforementioned alkoxysilyl group-containing resins not only exhibit good workability but also can be handled simply and easily, the workability improves furthermore.

Moreover, an electrode for secondary battery according to the present invention is characterized in that, in an electrode for secondary battery, electrode in which an active material is bound on a surface of electricity collector by way of a binder, said binder is an alkoxysilyl group-containing resinous cured substance that has a structure being specified by formula (II):

$R^1{}_m SiO(4-m)/2$ (II)

wherein "m"=an integer of from 0 to 2; and

"$R^1$" designates an alkyl group or aryl group whose number of carbon atoms is 8 or less.

The adhesiveness between the electricity collector and the active material, namely, inorganic substrates, is improved by means of the setting in which said binder is an alkoxysilyl group-containing resinous cured substance that has a structure being specified by formula (II): $R^1{}_n SiO(4-n)n$ wherein "m"=an integer of from 0 to 2; and "$R^1$" designates an alkyl group or aryl group whose number of carbon atoms is 8 or less.

As said alkoxysilyl group-containing resinous cured substance, it is possible to use the following: an alkoxy group-containing silane-modified bisphenol type-A epoxy resinous cured substance, an alkoxy group-containing silane-modified novolac-type epoxy resinous cured substance, an alkoxy group-containing silane-modified acrylic resinous cured substance, an alkoxy group-containing silane-modified phenolic resinous cured substance, an alkoxy group-containing silane-modified polyimide resinous cured substance, an alkoxy group-containing silane-modified soluble polyimide resinous cured substance, an alkoxy group-containing silane-modified polyurethane resinous cured substance, or an alkoxy group-containing silane-modified polyamide-imide resinous cured substance.

By means of adapting said alkoxysilyl group-containing resinous cured substance into one of the aforementioned cured substances, it is possible to turn the binder into a binder resinous cured substance that is excellent in terms of adhesiveness, and which is good in terms of heat resistance.

Moreover, it is preferable that the electrode for secondary battery can be an electrode for lithium-ion secondary battery. In particular, when being an electrode for negative electrode, the effect is high. It is allowable that the active material can also be one which includes carbon. Moreover, it is permissible that the electricity collector can comprise copper or aluminum, and that the active material can even be one which includes metal or metallic oxide that is capable of alloying with lithium. When using an electrode for lithium-ion secondary battery, electrode which has such a construction, the resulting electrode makes an electrode for secondary battery, electrode in which the active material is suppressed from coming off or falling down from the electricity collector, and which has excellent cyclic performance.

In particular, in the case where the metal or metallic oxide that is capable of alloying with lithium includes Si and/or Sn, by means of using the aforementioned binder resin, it is possible to inhibit the active-material particles from pulverizing finely or detaching, namely, the drawback that results from the following fact: the active material exhibits a considerably great rate of volumetric change being accompanied by the insertion and elimination of lithium so that it expands and contracts repeatedly by means of charge/discharge cycle.

Moreover, a manufacturing process for electrode for secondary battery according to the present invention is a manufacturing process for electrode for secondary battery, the manufacturing process comprising: an application step of applying a binder resin and an active material onto a surface of electricity collector; and a curing step of curing said binder resin and then binding said active material on said electricity-collector surface, and it is characterized in that said binder resin is an alkoxysilyl group-containing resin that has a structure being specified by formula (I).

By adapting the manufacturing process into one which uses such a binder resin, it is possible to manufacture an electrode for secondary battery, electrode in which the active material is less likely to come off from the electricity collector's surface.

Effect of the Invention

In the electrode for secondary battery according to the present invention, the active material is suppressed from coming off or falling down from the electricity collector by means of utilizing an alkoxysilyl group-containing resin, which has a structure being specified by formula (I), as the binder resin for electrode, and thereby it is possible for the present electrode to exhibit excellent cyclic performance.

BRIEF DESCRIPTION OF THE DRAWINGS

FIG. 2 illustrates a graph for comparing cyclic characteristics regarding batteries, in which negative electrodes according to Example Nos. 1 and 2 were used, with those regarding batteries, in which negative electrodes according to Comparative Example Nos. 1 and 2 were used; and FIG. 3 illustrates a graph for comparing a first-cycle charge/discharge curb regarding the battery, in which the negative electrode according Example No. 1 was used, in a cyclic test, with that regarding the battery, in which the negative electrode according to Comparative Example No. 2 was used, in that test.

EXPLANATION ON REFERENCE NUMERALS

Figure 1:
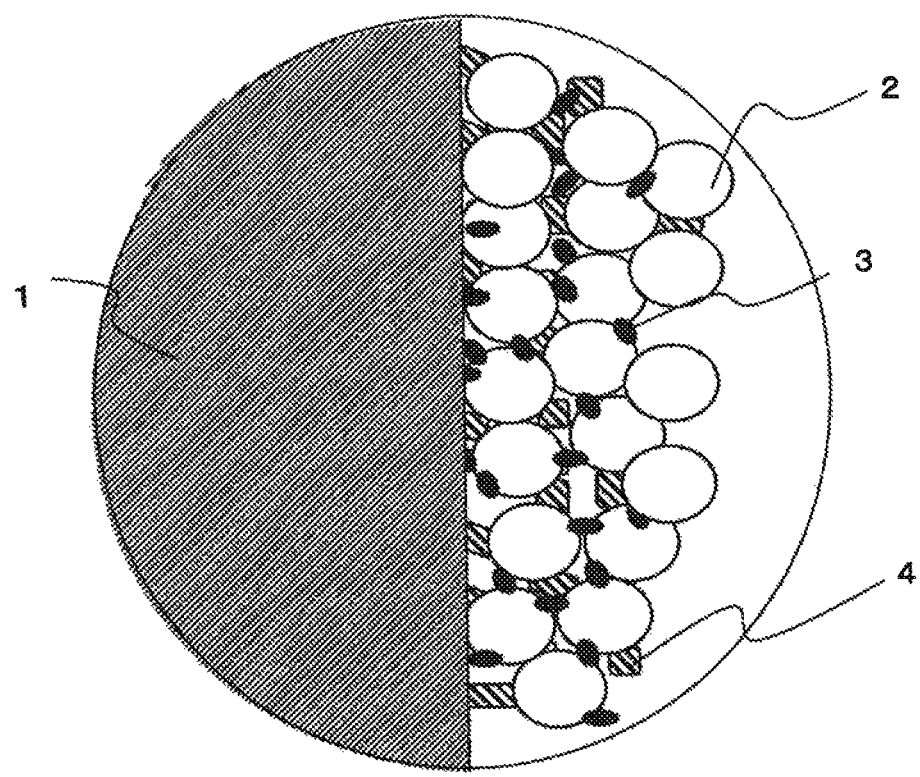
FIG. 1 illustrates a partial schematic explanatory diagram of an electrode for secondary battery.

1: Electricity Collector;
2: Active Materials;
3: Conductive Additives; and
4: Binder Resins

BEST MODE FOR CARRYING OUT THE INVENTION

An electrode for secondary battery according to the present invention is one which is manufactured via an application step of applying a binder resin and an active material onto a surface of electricity collector. As for a secondary battery that has such a construction, the following can be given: nickel-zinc secondary batteries; lithium-ion secondary batteries; silver oxide secondary batteries; and nickel-hydrogen secondary batteries.

The "applying" means that it is allowable that a binder resin, and an active material can be put onto an electricity collector. As for an application method, it is possible to use the following application methods that have been used generally when making electrodes for secondary battery: roll coating methods; dip coating methods; doctor blade methods; spray coating methods; and curtain coating methods.

The "electricity collector" refers to a chemically-inactive highly-electron-conductive body for keeping electric current flowing to electrodes during discharging or charging. The electricity collector is formed as a configuration, such as a foil or plate that is formed of said highly-electron-conductive body. The configuration is not limited to above especially as far as it is a configuration that fits for the objective. As for the electricity collector, it is possible to name copper foils, aluminum foils, and the like, for instance.

The "active material" refers to a substance that contributes directly to electrode reactions, such as charging reactions and discharging reactions. Although the substance that makes the active material differs depending on the types of secondary battery, it is not limited especially as far as being one into which substances that fit the objective of that secondary battery are inserted and from which those substances are released reversibly by means of charging/discharging. The active material that is used in the present invention has a powdery configuration, and is applied and then bound on the electricity collector's surface by way of the binder resin. Although the powder differs depending on batteries that are aimed for, it is preferable that the particle diameter can be 10 ktm or less.

For example, in the case of lithium-ion secondary battery, lithium-containing metallic composite oxides, such as lithium-cobalt composite oxides, lithium-nickel composite oxides and lithium-manganese composite oxides, can be used as for an active material for the positive electrode. For an active material for the negative electrode, the following can be used: carbonaceous materials that are capable of occluding and releasing lithium; and metals, which are capable of turning lithium into alloy, or oxides of these, and the like. It is possible to use these active materials independently, or it is possible to combine two or more species of them to use. As for the metals that are capable of turning lithium into alloy, the following can be given: Al, Si, Zn, Ge, Cd, Sn, Pb, and so forth. In particular, Si and Sn are effective. A theoretical capacity of carbon is 372 $mAhg^{-1}$, whereas theoretical capacities of Si, Ge and Sn, which are the metals that are capable of alloying with lithium, are 4,200 $mAhg^{-1}$, 1,620 $mAhg^{-1}$ and 994 $mAhg^{-1}$, respectively. However, the alloyable metals, or oxides of these, exhibit considerably great rates of volumetric change that is accompanied by the insertion and elimination of lithium, compared with those of the carbonaceous materials.

A composite powder of metals that are capable of turning lithium into alloy, or oxides thereof, and the like, can be produced by mean of mechanical alloying method. In this method, it is feasible to form fine primary particles whose particle diameters are from 10 to 200 nm approximately with ease. As for a specific method, it is possible to obtain a composite powder, namely, an active material that is aimed at, by means of setting the primary particle diameter to from 10 to 200 nm approximately by the following: mixing a raw-material substance comprising a plurality of components; and then carrying out a mechanical alloying treatment. It is preferable that a centrifugal acceleration (or input energy) in the mechanical alloying treatment can be from 5 to 20 G approximately, and it is more preferable that it can be from 7 to 15 G approximately.

It is allowable to apply conventionally-known methods as they are to the mechanical alloying treatment per se. For example, it is possible to obtain a composite powder, namely, an active material that is aimed at, by means of compositing a raw-material mixture (or alloying it partially) by repeating mixing and adhering by means of mechanical joining force. As for an apparatus to be made use of for the mechanical alloying treatment, it is possible to make use of the following as they are mixing machines, dispersing machines, pulverizing machines, and the like, which have been made use of generally in the field of powder. To be concrete, the following can be exemplified: kneading machines, ball mills, vibration mills, agitator mills, and so forth. In particular, it is desirable to use a mixing machine that can give shearing force to the raw-material mixture, because it is necessary to efficiently disperse particles, which have been overlapped or agglomerated during the compositing operation, one particle by one particle in order to make the overlapping powder, whose major component is made of a battery active material that exists between networks, less. Operational conditions for these apparatuses are not those which are limited in particular.

It is also possible to bind a conductive additive onto a surface of the electricity collector together with the active material. The conductive additive is one which is added in order to enhance electric conductivity when the active material is bound on the electricity collector by way of the binder resin. As for the conductive additive, it is allowable to add the following, namely, carbonaceous fine particles: carbon black, graphite, acetylene black, KETJENBLACK, carbon fibers, and the like, independently; or to combine two or more species of them to add.

The binder resin is used as a binding agent when applying these active material and conductive additive to the electricity collector. It is required for the binding resin to bind the active material and conductive additive together in an amount as less as possible, and it is desirable that that amount can be from 0.5% by weight to 50% by weight of a summed total of the active material, the conductive additive, and the binder resin. The binder resin according to the present invention is an alkoxysilyl group-containing resin that has a structure being specified by formula (I).

The structure that is specified by formula (I) includes a structure that is made of parts having undergone sol-gel reaction, and the alkoxysilyl group-containing resin makes a hybrid composite of resin and silica.

The "structure that is made of parts having undergone sol-gel reaction" is a structure that contributes to reactions in carrying out sol-gel process. The "sol-gel process" is process in which a solution of inorganic or organic metallic salt is adapted into a starting solution; and the resultant solution is turned into a colloid solution (Sol) by means of hydrolysis and condensation polymerization reactions; and then a solid (Gel) that has lost flowability is formed by facilitating the reactions furthermore. Generally speaking, metallic alkoxides (i.e., compounds that are expressed by WOR)x where "M" is a metal and "R" is an alkyl group) are adapted into a raw material in the sol-gel process.

The compounds that are expressed by $M(OR)_x$ react like following equation (A) by means of hydrolysis.

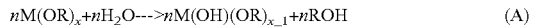

$$nM(OR)_x + nH_2O \dashrightarrow nM(OH)(OR)_{x-1} + nROH \quad (A)$$

The compounds turn into $M(OH)_x$, eventually when the reaction being shown herein is facilitated furthermore, and then react like following equation (B) when a condensation polymerization reaction occurs between two molecules being generated herein, that is, between two hydroxides.

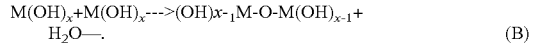

$$M(OH)_x + M(OH)_x \dashrightarrow (OH)x_{-1}M\text{-}O\text{-}M(OH)_{x-1} + H_2O\text{---}. \quad (B)$$

On this occasion, it is feasible for all the OH groups to undergo polycondensation; and moreover it is feasible for them to undergo dehydration/condensation polymerization reaction with organic polymers that possess an OH group at the terminal ends.

The binder resin can react not only between parts having undergone sol-gel reaction but also with the resin's OH groups at the time of curing binder resin, because of having a structure, which is made of parts that have undergone sol-gel reaction, as indicated by formula (I). Moreover, the binder resin exhibits good adhesiveness to the electricity collector, active material and conductive additive, namely, inorganic components, because of being a hybrid composite of resin and silica, and consequently it is possible to retain the active material and conductive additive on the electricity collector firmly.

On this occasion, as for the resin that makes a hybrid composite with silica, the following can be given: bisphenol type-A epoxy resins, novolac-type epoxy resins, acrylic resins, phenolic resins, polyamic acid resins, soluble polyimide resins, polyurethane resins, or polyamide-imide resins. It is possible to adapt these resins and silica into hybrid composites, which have a structure that is specified by formula (I), by means of sol-gel process, thereby turning into the following, respectively: alkoxy group-containing silane-modified bisphenol type-A epoxy resins, alkoxy group-containing silane-modified novolac-type epoxy resins, alkoxy group-containing silane-modified acrylic resins, alkoxy group-containing silane-modified phenolic resins, alkoxy group-containing silane-modified polyamic acid resins, alkoxy group-containing silane-modified soluble polyimide resins, alkoxy group-containing silane-modified polyurethane resins, or alkoxy group-containing silane-modified polyamide-imide resins. In this instance, the binder resin has a structure that is specified by formula (I), and this indicates such a state that parts that have undergone sol-gel reaction still remain therein. Therefore, it is possible for the binder resin to react not only between the parts that have undergone sol-gel reaction but also with the resin's OH groups at the time of curing binder resin by adapting the binder resin into an alkoxysilyl group-containing resin that has a structure being specified by formula (I).

It is possible to synthesize the aforementioned binder resins by means of publicly-known technique, respectively. For example, in the case of using an alkoxy group-containing silane-modified polyamic acid resin as the binder resin, the binder resin can be formed by reacting precursors, namely, a polyamic acid comprising a carboxylic-acid-anhydride component and a diamine component, and an alkoxysilane partial condensate. As for the alkoxysilane partial condensate, it is possible to use those which are obtained by condensing hydrolysable alkoxysilane monomers partially in the presence of acid or base catalyst and water. On this occasion, it is also permissible that the alkoxy group-containing silane-modified polyamic acid resin can be formed as follows: the alkoxysilane partial condensate is reacted with an epoxy compound in advance to turn it into an epoxy group-containing alkoxysilane partial condensate; and the resulting epoxy group-containing alkoxysilane partial condensate is then reacted with the polyamic acid.

Moreover, as for the aforementioned binder resin, it is possible to use commercial products suitably. For example, various commercial products are available as follows: "COMPOCERAN E (product name)" (produced by ARAKAWA CHEMICAL INDUSTRIES, LTD.), namely, an alkoxy group-containing silane-modified bisphenol type-A epoxy resin or alkoxy group-containing silane-modified novolac-type epoxy resin; "COMPOCERAN AC (product name)" (produced by ARAKAWA CHEMICAL INDUSTRIES, LTD.), namely, an alkoxy group-containing silane-modified acrylic resin; "COMPOCERAN P (product name)" (produced by ARAKAWA CHEMICAL INDUSTRIES, LTD.), namely, an alkoxy group-containing silane-modified phenolic resin; "COMPOCERAN H800 (product name)" (produced by ARAKAWA CHEMICAL INDUSTRIES, LTD.), namely, an alkoxy group-containing silane-modified polyamic acid resin; "COMPOCERAN H700 (product name)" (produced by ARAKAWA CHEMICAL INDUSTRIES, LTD.), namely, an alkoxy group-containing silane-modified soluble polyimide resin; "UREANO U (product name)" (produced by ARAKAWA CHEMICAL INDUSTRIES, LTD.), namely, an alkoxy group-containing siiane-modifiedpolyurethane resin; or "COMPOCERAN H900 (product name)" (produced by ARAKAWA CHEMICAL INDUSTRIES, LTD.), namely, an alkoxy group-containing silane-modified polyamide-imide resin.

Shown below is a chemical formula of the basic framework for each of the aforementioned following ones: "COMPOCERAN E (product name)" (produced by ARAKAWA CHEMICAL INDUSTRIES, LTD.); "COMPOCERAN AC (product name)" (produced by ARAKAWA CHEMICAL INDUSTRIES, LTD.); "COMPOCERAN P (product name)" (produced by ARAKAWA CHEMICAL INDUSTRIES, LTD.); "COMPOCERAN H800 (product name)" (produced by ARAKAWA CHEMICAL INDUSTRIES, LTD.); and "COMPOCERAN H900 (product name)" (produced by ARAKAWA CHEMICAL INDUSTRIES, LTD.)

(Chemical Formula 2)

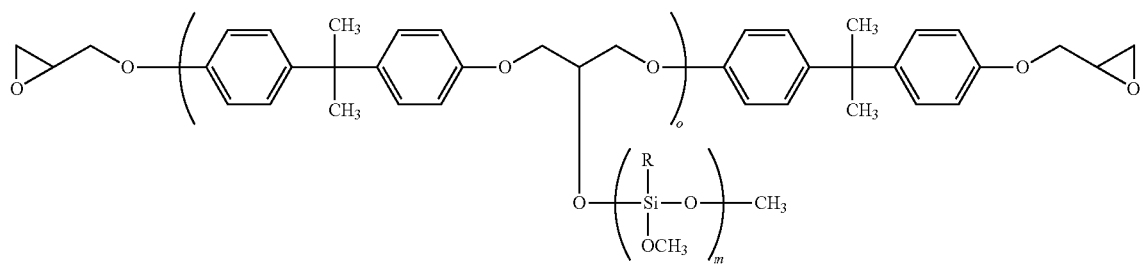

Trifunctionality: R = CH$_3$; or
Tetrafunctionality: R = OCH$_3$
Bisphenol Type-A Epoxy Type, i.e., One of "COMPOCERAN E" Products (Chemical Formula 3)

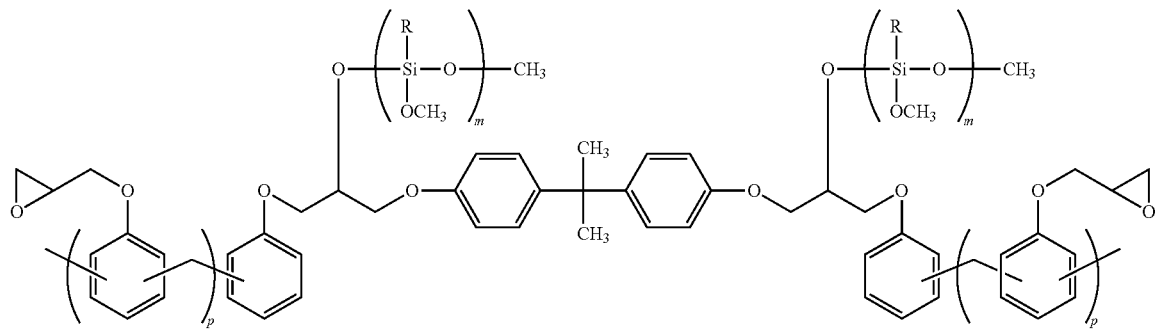

Trifunctionality: R = CH$_3$; or
Tetrafunctionality: R = OCH$_3$
Phenol Novolac Epoxy Type, i.e., One of "COMPOCERAN E" Products (Chemical Formula 4)

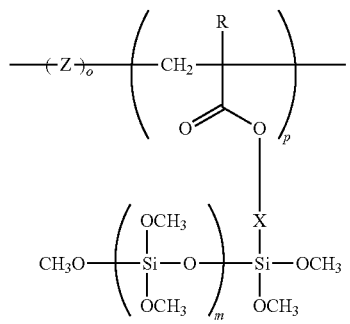

"COMPOCERAN AC"

(Chemical Formula 5)

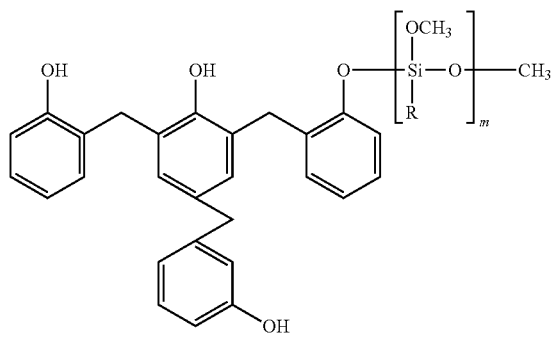

R = CH₃
R = OCH₃

"COMPOCERAN P"

(Chemical Formula 6)

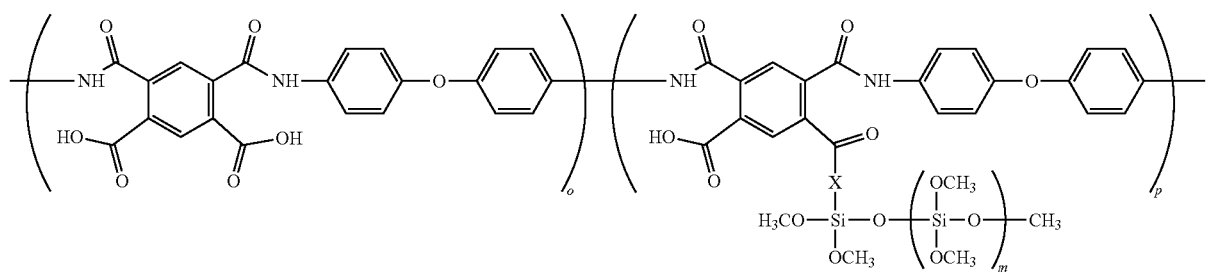

"COMPOCERAN H800"

(Chemical Formula 7)

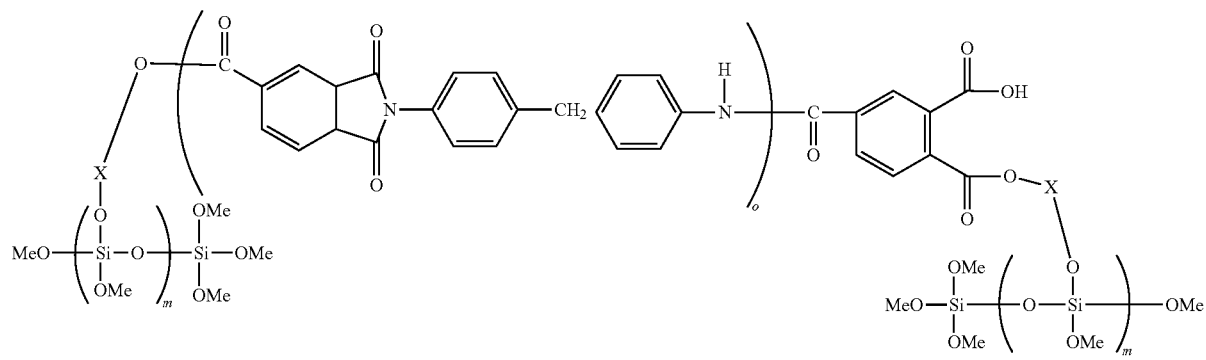

"COMPOCERAN H900"

Moreover, an electrode for secondary battery according to the present invention is an electrode for secondary battery, electrode in which an active material is bound on a surface of electricity collector. It is allowable that a conductive additive can also be bound on the surface of electricity collector together with the active material. The electricity collector, active material and conductive additive are those which are the same as those being aforementioned. Said binder is an alkoxysilyl group-containing resinous cured substance that has a structure being specified by formula (II): $R^i_m SiO(4-m)/2$ wherein "m"=an integer of from 0 to 2; and "$R^1$" designates an alkyl group or aryl group whose number of carbon atoms is 8 or less. The structure that is specified by formula (II) is a structure that is made of gelated fine silica parts (or a high-order network structure with siloxane bonds). This structure is a structure of organic silicone polymer that comprises siloxane bonds, and is a structure that is obtainable by means of the polycondensation of silanol according to following equation (C).

$$nR_m Si(OH)_{4-m} \longrightarrow (R_m SiO_{(4-m)/2})n \qquad \text{Equation (C)}$$

where "R": Organic Group, "m"=from 1 to 3, and n>1 For the alkoxysilyl group-containing resinous cured substance, it is possible to use the following: alkoxy group-containing silane-modified bisphenol type-A epoxy resinous cured substances, alkoxy group-containing silane-modified novolac-type epoxy resinous cured substances, alkoxy group-containing silane-modified acrylic resinous cured substances, alkoxy group-containing silane-modified phenolic resinous cured substances, alkoxy group-containing silane-modified polyimide resinous cured substances, alkoxy group-containing silane-modified polyurethane resinous cured substances, or alkoxy group-containing silane-modified polyamide-imide resinous cured substances. This binder corresponds to cured substances of the above-explained binder resins.

Moreover, a manufacturing process according to the present invention for electrode for secondary battery comprises an application step, and a curing step.

The application step is a step of applying a binder resin and an active material onto a surface of electricity collector. Moreover, it is also permissible to apply a conductive additive together with them at the application step.

The curing step is a step of curing said binder resin and then binding said active material on said electricity-collector surface. Said binder resin is characterized in that it is an alkoxysilyl group-containing resin that has a structure being specified by formula (I).

At the application step, it is possible to apply the binder resin and active material onto the electricity collector after mixing them in advance and then turning them into a slurry by adding a solvent, or the like, to the resulting mixture. It is permissible that a conductive additive can also be turned into a slurry together with them and can then be applied to the electricity collector. It is preferable that an applied thickness can be from 10 μm to 300 μm. Moreover, it is preferable that a mixing proportion of the binder resin and active material can be the active material: the binder resin=from 99:1 to 70:30 by parts by weight. In the case of including a conductive additive, it is preferable that a mixing proportion of the binder resin, active material and conductive additive can be the active material: the conductive additive: the binder resin •=from 98:1:1 to 60:20:20 by parts by weight.

The curing step is a step of curing the binder resin, namely, an alkoxysilyl group-containing resin. The active material is bound on the electricity-collector surface by means of curing the binder resin. In the case of including a conductive additive, the conductive additive is also bound thereon similarly. It is permissible that the curing of the binder resin can be done in conformity to the curing condition of a binder resin to be made use of. Moreover, in the curing of the binder resin, a sol-gel curing reaction also occurs, sol-gel reaction which results from the structure being specified by formula (I) that the binder resin has. An alkoxysilyl group-containing resin in which the sol-gel curing reaction has occurred exhibits good adhesiveness to the active material, conductive additive and electricity collector, because it has a structure that is made of gelated fine silica parts (or a high-order network structure with siloxane bonds)

EXAMPLES

Hereinafter, the present invention will be explained in more detail while giving examples. A partial schematic explanatory diagram of an electrode for secondary battery according to the present invention is illustrated in FIG. 1. An example of the electrode for secondary battery according to the present invention is one in which active materials 2, and conductive additives 3 are bound on a surface of electricity collector 1 by way of binder resins 4. The binder resins 4 are dispersed between the dispersed active materials 2 and the dispersed conductive additives 3, and make such a state that they join the active materials 2, conductive additives 3 and electricity collector 1 one another to put them together. Since FIG. 1 is a schematic drawing, the drawn configurations are not correct ones. Although the binder resins 4 are depicted as a powdery configuration in FIG. 1, they have indeterminate forms. Moreover, as shown in FIG. 1, the entire surface of the electricity collector 1 is not covered with the binder resins 4, the active materials 2 and/or the conductive additives 3 completely, but minute pores exist between the respective substances and the surface of the electricity collector 1 here and there.

The electrode for secondary battery according to the present invention was made as follows, and then a discharging cyclic test was carried out using a model battery for evaluation. In the test, the negative electrode of lithium-ion secondary battery was adapted into an electrode to be evaluated, and a coin-shaped lithium-ion secondary battery was used.

(Making of Electrodes for Evaluation)

Example No. 1, Example No. 2, Comparative Example No. 1, and Comparative Example No. 2

As an active material, an Si powder was used, Si powder whose discharge capacity was large, and whose particle diameters were about 4, um or less. Although Si powder is good in terms of the discharge capacity compared with that of the other active materials, it is likely to come off from electricity collectors because of the expansion of its own particles; moreover, it has fallen down from them because the active materials are pulverized finely due to volumetric expansion that results from charging/discharging, and thereby the discharge capacity declines sharply at the time of cyclic test.

As the Si powder, Si particles (produced by KO-JUNDO KAGAKU) with 4-, μm-or-less particle diameters were made use of as they were.

10 parts by weight of a paste in which a binder resin was dissolved in N-methylpyrrolidone (or NMP), and 5 parts by weight of KETJENBLACK (or KB) were added to 85 parts by weight of the Si powder, and were then mixed to prepare a slurry.

For the binder resin, those being specified in Table 1 were used. In Example No. 1, an alkoxy group-containing silane-modified polyamide-imide resin was used, alkoxy group-containing silane-modified polyamide-imide resin which was produced by ARAKAWA CHEMICAL INDUSTRIES, LTD.; whose product name was COMPOCERAN; whose product number was H901-2; whose solvent composition was NMP/xylene (or Xyl); which had cured residuals in an amount of 30%; which exhibited a viscosity of 8,000 mPa·s; and which had silica in an amount of 2% by weight in the cured residuals (note herein that the "cured residuals" means solid contents after removing the volatile components by curing the resinous components). The alkoxy group-containing silane-modified polyamide-imide resin that was used in Example No. 1 was one of aforementioned COMPOCERAN (product name) H900-series products, and had a structure that is specified in above (Chemical Formula 7).

In Example No. 2, an alkoxy group-containing silane-modified polyamic acid resin was used, alkoxy group-containing silane-modified polyamic acid resin which was produced by ARAKAWA CHEMICAL INDUSTRIES, LTD.; whose product name was COMPOCERAN; whose product number was H850D; whose solvent composition was N, N-dimethylacetamide (DMAc); which had cured residuals in an amount of 15%; which exhibited a viscosity of 5,000 mPa·s; and which had silica in an amount of 2% by weight in the cured residuals. The alkoxy group-containing silane-modified polyamic acid resin that was used in Example No. 2 was one of aforementioned COMPOCERAN (product name) H800-series products, and had a structure that is specified in above (Chemical Formula 6).

In Comparative Example No. 1, PVdF (produced by KUREHA) was used. In Comparative Example No. 2, a polyamide-imide resin (produced by ARAKAWA CHEMICAL INDUSTRIES, LTD.) was used.

After preparing the aforementioned slurries, the slurries are put on an electrolytic copper foil with $20_{Th}$ um thickness, and were then formed as a film on the copper foil, respectively, using a doctor blade.

After drying the thus obtained sheets at 80° C. for 20 minutes and then removing NMP by evaporation, an electricity collector, which comprised the electrolytic copper foil, and negative-electrode layers, which comprised the aforementioned complex powders, were joined together firmly by means of adhesion with a roller pressing machine. These were punched out with a 1-cm² circular punch, and were then adapted into an electrode with 100-, um-or-less thickness by vacuum drying them as follows, respectively: at 200° C. for 3 hours in Example No. 1 and Example No. 2; at 140° C. for 3 hours in Comparative Example No. 1; and at 200° C. for 3 hours in Comparative Example No. 2.

TABLE 1

| | Binder Resin |
|---|---|
| Example No. 1 | Alkoxy Group-containing Silane-modified Polyamide-imide Resin |
| Example No. 2 | Alkoxy Group-containing Silane-modified Polyamic Acid Resin |
| Comparative Example No. 1 | PVdF (Polyvinylidene Fluoride) |
| Comparative Example No. 2 | Polyamide-imide Resin |

(Making of Coin-Shaped Batteries)

Coin-shaped model batteries (type "CR2032") were made within a dry room while adapting the aforementioned electrodes into the negative electrode, adapting metallic lithium into the positive electrode, and adapting a solution, namely, 1-mol $LiPF_6$/ethylene carbonate (or EC)+diethyl carbonate (or DEC) where EC:DEC=1:1 (by volume ratio), into the electrolyte. The coin-shaped model batteries were made by overlapping a spacer, an Li foil with 500p, m thickness making a counter electrode, a separator ("Celgard #2400" (trademark name) produced by CELGARD, LLC), and the evaluation electrodes in this order, and then subjecting them to a crimping process.

(Evaluation for Coin-Shaped Batteries)

An evaluation of each of the electrodes to be evaluated in these model batteries were carried out by the following method.

First of all, model batteries were discharged at a constant electric current of 0.2 mA until reaching 0 V, and were then charged at a constant electric current of 0.2 mA until reaching 2.0 V after having a 5-minute intermission. These were considered 1 cycle, and the charging/discharging was carried out repeatedly to examine their discharge capacities.

FIG. 2 illustrates a graph that shows the number of the cycles and the discharge capacities which are relevant to the model batteries according to the respective examples and comparative examples. It is apparent from FIG. 2 that the decrease magnitudes of the initial discharge capacity were small in the batteries in which the respective examples were adapted into the evaluation electrode, compared with those of the batteries in which the respective comparative examples were adapted into the evaluation electrode.

As specified by Comparative Example No. 1, in the electrode that used PVdF, namely, a conventional binder resin, the discharge capacity dropped sharply to almost 10% approximately after being subjected to the cyclic test once, whereas the discharge capacities were maintained as much as from 70% to 80% approximately in Example No. 1 and Example No. 2. Besides, it is understood that the after-20-cycle discharge capacities of Comparative Example No. 1 and Comparative Example No. 2 were 0, whereas the after-20-cycle discharge capacity was also maintained as much as 10% or more in Example No. 2.

In the case of adapting the Si particles into the active material, the first-round discharge capacity exceeded 3,000 mAh/g. It is remarkable that the discharge capacity remained as much as 375 mAh/g approximately after 20 cycles in Example No. 2, because the first-round discharge capacity was 400 mAh/g or less usually in the case of using graphite as the active material.

Moreover, Example No. 1 and Comparative Example No. 2 made one which comprised the polyamide-imide resin into which silica was incorporated, and another one which comprised the polyamide-imide resin into which no silica was incorporated, respectively. As illustrated in FIG. 2, it is possible to see that the discharge characteristic of Example No. 1 was superior to the discharge characteristic of Comparative Example No. 2.

FIG. 3 illustrates a comparison between the charge/discharge curves at the first cycle in the cyclic test. Example No. 1 comprised the binder resin into which silica was incorporated in an amount of 2%, whereas Comparative Example No. 2 comprised the binder resin into which no silica was incorporated. As can be viewed in FIG. 3, when comparing the first-cycle discharge characteristic of Example No. 1 with that of Comparative Example No. 2, it is possible to see that the former was superior to the latter almost doubly.

The invention claimed is:

1. A manufacturing process for electrode for secondary battery, the manufacturing process comprising:
    an application step of applying a binder resin and an active material onto a surface of electricity collector; and
    a curing step of curing said binder resin and then binding said active material on said electricity-collector surface,
    the manufacturing process for electrode for secondary battery being characterized in that said binder resin is an alkoxysilyl group-containing resin that has a structure being specified by formula (I);

(Chemical Formula 1)

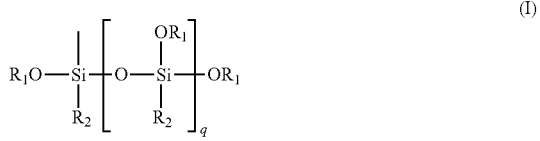

wherein "$R_1$" is an alkyl group whose number of carbon atoms is from 1 to 8;

"$R_2$" is an alkyl group or alkoxyl group whose number of carbon atoms is from 1 to 8; and "q" is an integer of from 1 to 100.

2. The manufacturing process for electrode for secondary battery as set forth in claim 1, wherein said alkoxysilyl group-containing resin is an alkoxy group-containing silane-modified polyamic acid resin.

3. The manufacturing process for electrode for secondary battery as set forth in claim 1, wherein said alkoxysilyl group-containing resin is an alkoxy group-containing silane-modified polyamide-imide resin.

* * * * *

UNITED STATES PATENT AND TRADEMARK OFFICE
CERTIFICATE OF CORRECTION

PATENT NO. : 10,424,791 B2  
APPLICATION NO. : 14/987859  
DATED : September 24, 2019  
INVENTOR(S) : Hitotoshi Murase et al.

Page 1 of 1

It is certified that error appears in the above-identified patent and that said Letters Patent is hereby corrected as shown below:

On the Title Page

Item (73), after "Assignee:," insert -- Kabushiki Kaisha Toyota Jidoshokki, Aichi-ken (JP) --.

Item (62), under "Related U.S. Application Data," delete "Jul. 14, 2006" and insert -- Jul. 14, 2008 --.

Signed and Sealed this  
Fifth Day of January, 2021

Andrei Iancu  
*Director of the United States Patent and Trademark Office*